(12) United States Patent
Knijnenburg et al.

(10) Patent No.: US 10,041,849 B2
(45) Date of Patent: Aug. 7, 2018

(54) SYSTEM FOR DETECTING A PRESSURE DIFFERENCE BETWEEN THE INTERIOR AND THE EXTERIOR OF AN AIRCRAFT

(71) Applicant: Airbus Operations GmbH, Hamburg (DE)

(72) Inventors: Thorsten Knijnenburg, Hamburg (DE); Albin Poth, Hude (DE)

(73) Assignee: Airbus Operations GmbH, Hamburg (DE)

( * ) Notice: Subject to any disclaimer, the term of this patent is extended or adjusted under 35 U.S.C. 154(b) by 209 days.

(21) Appl. No.: 14/844,413

(22) Filed: Sep. 3, 2015

(65) Prior Publication Data

US 2016/0061680 A1 Mar. 3, 2016

(30) Foreign Application Priority Data

Sep. 3, 2014 (EP) .................................... 14183457

(51) Int. Cl.
| | | |
|---|---|---|
| *G01L 9/00* | (2006.01) | |
| *G01F 13/00* | (2006.01) | |
| *G01F 1/34* | (2006.01) | |
| *G01L 13/06* | (2006.01) | |
| *G01L 19/14* | (2006.01) | |

(Continued)

(52) U.S. Cl.
CPC ............ *G01L 13/06* (2013.01); *B64C 1/1492* (2013.01); *B64D 13/04* (2013.01); *G01L 19/143* (2013.01); *Y02T 50/44* (2013.01)

(58) Field of Classification Search
None
See application file for complete search history.

(56) References Cited

U.S. PATENT DOCUMENTS

| | | | | |
|---|---|---|---|---|
| 4,065,894 A | * | 1/1978 | Day .......................... | E06B 3/64 |
| | | | | 52/171.3 |
| 7,207,524 B2 | * | 4/2007 | Puschmann ............... | B64C 1/14 |
| | | | | 116/70 |

(Continued)

FOREIGN PATENT DOCUMENTS

EP    0 448 308    9/1991

OTHER PUBLICATIONS

European Search Report cited in EP 14 18 3457 completed Feb. 6, 2015, five pages.

*Primary Examiner* — Manish S Shah
*Assistant Examiner* — Jermaine Jenkins
(74) *Attorney, Agent, or Firm* — Nixon & Vanderhye P.C.

(57) ABSTRACT

A system to detect a pressure difference between the interior of a cabin of an aircraft and the exterior of the aircraft. The system includes a window arrangement having a first windowpane with a first surface and an opposite second surface and is adapted to be mounted in an aircraft such that the first surface of the first windowpane faces the exterior of the aircraft and is subjected to ambient outside atmospheric pressure and the second surface faces the cabin interior, and a pressure sensor including a first pressure port. The first windowpane includes a first air passage opening extending between the first and second surfaces of the first windowpane, and the pressure sensor is sealingly connected to the first air passage opening such that the first pressure port of the pressure sensor is subjected to pressure acting on the first surface of the first windowpane.

20 Claims, 2 Drawing Sheets

(51) Int. Cl.
*B64C 1/14* (2006.01)
*B64D 13/04* (2006.01)

(56) References Cited

U.S. PATENT DOCUMENTS

| | | | |
|---|---|---|---|
| 7,633,409 B2* | 12/2009 | Naegler | B64C 1/1407 |
| | | | 340/945 |
| 8,149,140 B2* | 4/2012 | Hellwig | B64C 1/14 |
| | | | 340/945 |
| 8,384,520 B2* | 2/2013 | Fourreau | G09F 3/0297 |
| | | | 340/10.1 |
| 9,114,870 B2* | 8/2015 | Chaumel | B64C 1/1484 |
| 9,308,983 B2* | 4/2016 | Mueller | B64C 1/1492 |
| 9,403,590 B2* | 8/2016 | Driscoll | B64C 1/1492 |
| 2006/0006285 A1 | 1/2006 | Puschmann et al. | |
| 2008/0088483 A1 | 4/2008 | Hellwig | |
| 2013/0168495 A1 | 7/2013 | Mueller et al. | |
| 2015/0047275 A1* | 2/2015 | McCarthy | B64C 1/14 |
| | | | 52/204.51 |

* cited by examiner

SYSTEM FOR DETECTING A PRESSURE DIFFERENCE BETWEEN THE INTERIOR AND THE EXTERIOR OF AN AIRCRAFT

RELATED APPLICATION

This application claims priority to European application number 14183457.2 filed 3 Sep. 2014, the entirety of which is incorporated by reference.

BACKGROUND

The present invention relates to a system for detecting a pressure difference between the interior of a cabin of an aircraft and the exterior of the aircraft.

In most aircraft, and in particular in passenger aircraft, the interior of the fuselage in general and the cabin in particular is pressurized during flight to maintain the pressure in the cabin equal to a pressure corresponding to a low altitude at which the human body is unlikely to notice a deviation from sea level pressure, even if the aircraft is traveling at a cruise altitude of, e.g., 10,000 meters.

For this purpose, the aircraft is typically provided with a means for continuously pumping air from the exterior of the aircraft into the fuselage and the cabin, and with one or more so-called outflow valves for continuously venting air from the interior of the fuselage and cabin. The ratio of the flow of air into the cabin and the flow of air out of the cabin is adjusted either manually or automatically to thereby obtain and maintain the desired pressure inside the cabin.

In the case of aircraft having gas turbine engines, the means for pumping air into the cabin usually comprises a bleed air supply system which is adapted for taking air from the engines after it has been compressed by the engines but before it is mixed with fuel, and for delivering this air to the cabin. The outflow valves are typically structurally reinforced ports or openings in the aircraft fuselage which can be selectively opened and closed by means of a valve flap.

If an automatic control of the outflow valves is provided, this is effected by means of a cabin pressure control system which operates the one or more outflow valves and usually also controls the inflow of air into the cabin. Even in case of such automated systems, there is usually the possibility of manually controlling the outflow valves in cases of malfunctions of the automatic control.

The desired cabin pressure is set by the cabin pressure control system. Before take-off, the pilot enters the cruise altitude into the cabin pressure control system, which after take-off gradually modifies the cabin pressure in such a manner that abrupt changes are avoided during ascending and that the desired cabin pressure set by the cabin pressure control system is achieved when reaching cruise altitude. For this purpose, the outflow valves, which are fully open on the ground, are gradually closed while the aircraft is climbing.

Prior to the aircraft starting its descent for landing, the altitude of the destination airport is entered into the cabin pressure control system. During the descent, the outflow valves are gradually opened in such a manner that the cabin pressure matches the ground pressure at the destination airport upon touchdown. Thus, if working and operated correctly the cabin pressure control system also serves to equalize the pressure in the cabin with the ambient pressure at the destination airport and prevent the occurrence of a residual cabin pressure after landing at the time the doors or other closing devices for apertures in the fuselage of the aircraft are to be opened. Equalizing the pressure between the cabin and the ambient pressure at the destination airport aids safely opening the doors of the aircraft. An overpressure condition in the cabin is to be avoided because the overpressure could cause the door of the aircraft to swing violently when opened and thereby risking that the person operating the door or closing device or other persons are hurt and that the aircraft or surrounding equipment is damaged.

To prevent such accidents passenger aircrafts are typically provided with means for measuring the cabin pressure and for indicating or displaying the cabin pressure or for warning in case of the occurrence of a potentially dangerous residual cabin pressure, such as, e.g., a pressure difference of greater than 2.5 mbar between the cabin pressure and the ambient atmospheric pressure. Such indicating or warning systems may, in particular, be integrated into the doors or closing devices and may be provided with an autonomous energy device and controller to ensure that they are operable even in case the aircraft has been powered down following reaching the parking position and the on-board power network is therefore switched off partially or completely. The warning may take the form of an acoustic and/or optical alarm provided on or near the door or closing device. If a warning is received or an overpressure condition is indicated, the aircraft crew may simply wait or manually (further) open the outflow valves or a specifically provided valve to allow for rapid pressure equalization.

It is to be noted that residual cabin pressures may occur even if the cabin pressure control system is in principle operating correctly.

As mentioned above, the control system typically relies on the pilot entering the correct altitude of the destination airport, so that the cabin pressure control system is able to appropriately control the outflow valves such that the cabin pressure matches the ambient pressure at the destination airport upon touchdown. Thus, entry of an incorrect altitude may result in a residual cabin pressure.

Further, the cabin pressure control system typically comprises a manual override mechanism. While this mechanism is advantageous for being able to deactivate the automatic operation of an incorrectly operating system or of a system which is not adapted to particular conditions, inappropriate operation can also result in a residual cabin pressure.

Moreover, it is common practice for the crew or ground personnel to manually close the outflow valves while the aircraft is located on the ground, e.g. for preventing entry of animals or dirt through the outflow valves into the fuselage and cabin. In that case the outflow valves no longer function to prevent the buildup of internal pressure on the ground, e.g. due to heating caused by sunlight exposure. To be useful in the latter case, residual cabin pressure indicators or warning devices cannot only rely on the supply of electrical energy from normal energy sources of the aircraft, because these may not be operable at all times while the aircraft is powered down.

Present residual cabin pressure indicators or warning devices include a mechanical pressure sensor, which is operably connected to a tube or pipe system of a different aircraft system, which utilizes the tube or pipe system and is adapted and operable for detecting and determining flight critical data, such as, e.g., altitude and velocity. This tube or pipe system comprises two external pressure ports arranged in the fuselage of the aircraft.

Although—different from the system for detecting and determining flight critical data—residual cabin pressure detection is required when the aircraft is on the ground, very demanding requirements must therefore be met by the pressure sensor, which requirements are determined by the requirements to be met by the flight critical system. This also applies to maintenance of the pressure sensor and the residual cabin pressure indicator or warning device relying thereon.

SUMMARY OF INVENTION

A system has been invented and is disclosed herein which is operable to safely detect the occurrence of a residual cabin pressure and which is constructed in a simple manner. The system detects a pressure difference between the interior of a cabin of an aircraft and the exterior of the aircraft. The system is adapted for detecting a pressure difference between the interior of a cabin of an aircraft and the exterior of the aircraft, such as an overpressure in the interior of a cabin of an aircraft with respect to the exterior of the aircraft. For this purpose the system comprises a window arrangement, which is adapted to be mounted in an aircraft, and a pressure sensor.

The window arrangement comprises a first windowpane, which may be a transparent element, having a first surface and an opposite second surface. These first and second surfaces are opposite extended surfaces of the first windowpane. When mounted, as intended, in an aircraft, the first surface of the first windowpane is facing towards the exterior of the aircraft and is subjected to the ambient atmospheric pressure existing around the aircraft, such as the external pressure existing exterior to the aircraft, and the second surface faces towards the interior of a cabin of the aircraft. Thus, in the mounted condition the first surface of the first windowpane may in particular form a portion of an exterior surface of the aircraft. Further, in case the window arrangement comprises multiple windowpanes, the first windowpane constitutes the outer windowpane of the window arrangement.

The pressure sensor comprises a first pressure port, i.e. an opening or port which may be brought in fluid communication with a medium wherein the pressure sensor is adapted to sense the pressure of said medium either as an absolute value or relative to another pressure measurement. As will be explained further below, the pressure sensor may be a differential pressure sensor comprising a further pressure port and being adapted to sense a pressure difference between the pressures existing at the first pressure port and the further pressure port.

The first windowpane comprises a first air passage opening extending between the first and second surfaces of the first windowpane, such as a through-bore or through-hole allowing passage of air through the first windowpane. In other words, the first air passage opening is a fluid flow path arranged and adapted for providing fluid communication between the first and second surfaces of the first windowpane. The fluid flow path—and thus the first air passage opening—may take different forms and can, in particular, be provided by a straight, curved or tortuous passage or channel extending between the first and second surfaces of the first windowpane.

The pressure sensor is sealingly connected to the first air passage opening in such a manner that the first pressure port of the pressure sensor is subjected to pressure acting on the first surface of the first windowpane, i.e. to the ambient atmospheric pressure in the mounted condition of the system and its window arrangement. Thus, in the mounted condition and in operation the first pressure port is in fluid communication with the exterior of or the ambient atmosphere around the aircraft in which the system is mounted. Due to the sealing connection pressure equalization through the first air passage opening is prevented, because the pressure sensor in effect seals the first air passage opening in such a manner that in the mounted condition and in operation air cannot pass from the exterior of the aircraft through the first air passage opening into the interior of the cabin of the aircraft.

The above-described system provides the advantage that it is entirely separate from flight critical systems, so that less demanding requirements have to be met by the system in general and the pressure sensor in particular. For example, due to the entirely separate pressure port the system has relatively low leak rate requirements. Further, installation and maintenance are very simple, and retrofitting the system to existing aircraft is easily possible by merely replacing an existing window arrangement with the window arrangement of the system of the present invention.

As already briefly indicated above, the pressure sensor may further comprise a second pressure port which is arranged to be subjected to a pressure existing in a region on the side of the second surface of the first windowpane, such that in the mounted condition of the window arrangement the second pressure port is in fluid communication with the interior of the cabin of the aircraft. In this embodiment the pressure sensor is a differential pressure sensor adapted to detect a pressure difference between a pressure sensed at the first pressure port and a pressure sensed at the second pressure port, i.e. in the mounted condition and in operation the pressure difference between the interior of a cabin of an aircraft and the exterior of the aircraft. This arrangement advantageously avoids having to provide for a separate pressure sensor for detecting the pressure in the interior of the aircraft cabin. The pressure sensor may be an electronic differential pressure sensor. Such an electronic differential pressure sensor may be constructed to have a higher reliability, i.e. a lower mean time between failure, than a mechanical differential pressure sensor or switch.

The window arrangement may also comprise a second windowpane having a first surface and an opposite second surface. Similar to the case of the first windowpane, these first and second surfaces are opposite extended surfaces of the second windowpane. The second windowpane is mounted spaced from the first windowpane in such a manner that an interior space is defined by and between the first and second windowpanes. The first surface of the second windowpane faces the second surface of the first windowpane and the second surface of the second windowpane faces away from the first windowpane, i.e. towards the interior of the cabin of the aircraft in the mounted condition of the system. When mounted, as intended, in an aircraft, the second windowpane is disposed closer towards the cabin interior, and the second surface of the second windowpane may be subjected to the pressure inside the aircraft cabin. In particular, the second surface of the second windowpane may form a portion of an interior wall of the aircraft, such that the second windowpane constitutes the inner windowpane of the window arrangement. In any case, the window arrangement may be a two-windowpane window arrangement, which does not comprise a further windowpane in addition to the first windowpane and the second windowpane.

The pressure sensor may be a differential pressure sensor and one of the above embodiments in which the window arrangement comprises a second windowpane are combined. In that case, the second windowpane may comprise a second air passage opening extending between the first and second surfaces of the second windowpane, i.e. a through-bore or through-hole allowing passage of air through the second windowpane. In other words, the second air passage opening is a fluid flow path arranged and adapted for providing fluid communication between the first and second surfaces of the second windowpane. The fluid flow path—and thus the second air passage opening—may take different forms and can, in particular, be provided by a straight, curved or tortuous passage or channel extending between the first and second surfaces of the second windowpane.

In this embodiment the pressure sensor may be mounted inside the first air passage opening, and the second pressure port of the pressure sensor may be sealingly connected to the second air passage opening, in particular on the first surface of the second windowpane. In other words, on the one hand the pressure sensor itself is disposed partly or entirely inside the first air passage opening and is sealed to the air passage opening e.g. by sealing a housing of the pressure sensor to the air passage opening. The sealing connection between the second air passage opening of the second windowpane may be effected either by sealing the second pressure port directly to the second air passage opening or by sealing a tube or pipe connected to the second pressure port to the second air passage opening. However, it is also possible that the pressure sensor is dimensioned to also be partially disposed inside the second air passage opening. In the latter case, a portion of the pressure sensor is disposed in the interior space between the first and second windowpanes and extends between them. Similarly, in other cases in which the pressure sensor is disposed partly inside the first air passage opening, a portion of the pressure sensor is disposed in the interior space between the first and second windowpanes.

As an alternative the pressure sensor may be mounted inside and sealingly connected to the second air passage opening, and the first pressure port of the pressure sensor is sealingly connected to the first air passage opening, in particular on the second surface of the first windowpane. Similar considerations as explained in the preceding paragraph also apply to this case.

As a further alternative, the pressure sensor may be disposed in the interior space between the first and second windowpanes, and the first pressure port may be sealingly connected to the first air passage opening, in particular on the second surface of the first windowpane, and the second pressure port may be sealingly connected to the second air passage opening, in particular on the first surface of the second windowpane.

In any case, i.e. also in embodiments not comprising a second windowpane, the first pressure port of the pressure sensor may be sealingly connected to the first air passage opening, in particular on the second surface of the first windowpane, and/or the pressure sensor may be mounted partly or entirely inside the first air passage opening.

The pressure sensor may comprise an integrated threshold switch or comparator. This embodiment has the advantage that it can replace existing residual cabin pressure indicators or warning devices, which rely on differential pressure switches, without having to change the interface to the remaining aircraft systems, such as to a power source of the aircraft, e.g. an autonomous standby power supply unit (ASPSU).

The system may comprise an interface adapted for receiving energy from an external power supply. In particular, the external power supply may be, e.g., an electrical power source which is a part of the normal electrical power supply system of an aircraft, or an autonomous standby power supply unit (ASPSU) of the aircraft, e.g. an ASPSU which was provided in the aircraft for powering the mechanical pressure sensor replaced by pressure sensor of the system of the present invention. In the alternative, the system may comprise a power supply that is disposed inside a housing of the pressure sensor. The power supply, which may take the form of a rechargeable or non-rechargeable battery, provides the advantage that—at least for a certain time period—pressure can also be sensed in cases in which an aircraft is parked on the ground and powered down and in which the generation of potentially dangerous residual cabin pressures may occur, e.g., due to heating caused by sunlight exposure. The same effect can also be achieved if a separate power supply of the aircraft, in particular an autonomous standby power supply unit of an aircraft, is used which is adapted to supply energy for a certain time period after powering down the remainder of the aircraft.

The window arrangement may be part of an aircraft door. In other words, the system of the invention then comprises an aircraft door having a window arrangement which is constituted by the window arrangement of the system or is an integral part of an aircraft door, and such an aircraft door or the system itself may be an integral part of an aircraft. The door may be a cargo door or a passenger door. Although it is in principle also possible for the window arrangement of the system being a window arrangement separate from a door and not mounted in a door, constructing the window arrangement as part of an aircraft door provides the advantage that the system is arranged at a location at which a warning of a dangerous residual pressure condition is to be issued and that the system can be integrated in a particularly simple manner into an electrical door monitoring system, if available. In this manner costs and weight can be saved.

In another embodiment the system or an aircraft, in which the system is mounted, comprises a pressure indicator or warning device, and in particular a residual cabin pressure indicator or warning device, which is coupled to the pressure sensor or to a processing device coupled to the pressure sensor and adapted and arranged to receive and evaluate signals from the pressure sensor. The pressure indicator or warning device is adapted to indicate one or more predetermined pressure conditions, in particular a residual cabin pressure exceeding a predetermined threshold. However, the system may also be adapted to interface with an external such pressure indicator or warning device.

It may be advantageous if the system comprises a heating device adapted and arranged to heat the first pressure port, thereby avoiding negatively affecting the function of the first pressure port and of the pressure sensor due to icing. If a pressure sensor is used comprising a second pressure port, the same heating device may also be adapted and arranged for heating the second pressure port or the system may comprise a further heating device adapted and arranged for heating the second pressure port.

An aircraft may further comprise a processing device coupled to the system, wherein the processing device is adapted to determine whether the aircraft is on the ground and to evaluate signals from the pressure sensor only if the aircraft is on the ground. For this purpose, the aircraft in general or the system in particular may advantageously comprise a sensor operatively coupled to the processing device and adapted for detecting the occurrence of one or more predetermined landing indication events, such as touchdown of the aircraft or stopping of the aircraft, and for generating a corresponding detection signal. The processing device, which may advantageously be the same as the one mentioned above, is adapted for evaluating signals from the pressure sensor only after receiving the first detection signal. It is also possible that the pressure sensor itself is adapted to determine whether the aircraft is on the ground in the same manner as described for the processing device, and to provide signals only if it detected that the aircraft is on the ground.

SUMMARY OF THE DRAWINGS

In the following, an embodiment of the invention is explained in detail with reference to the enclosed Figures.

DETAILED DESCRIPTION OF EMBODIMENTS OF THE INVENTION

Figure 1:
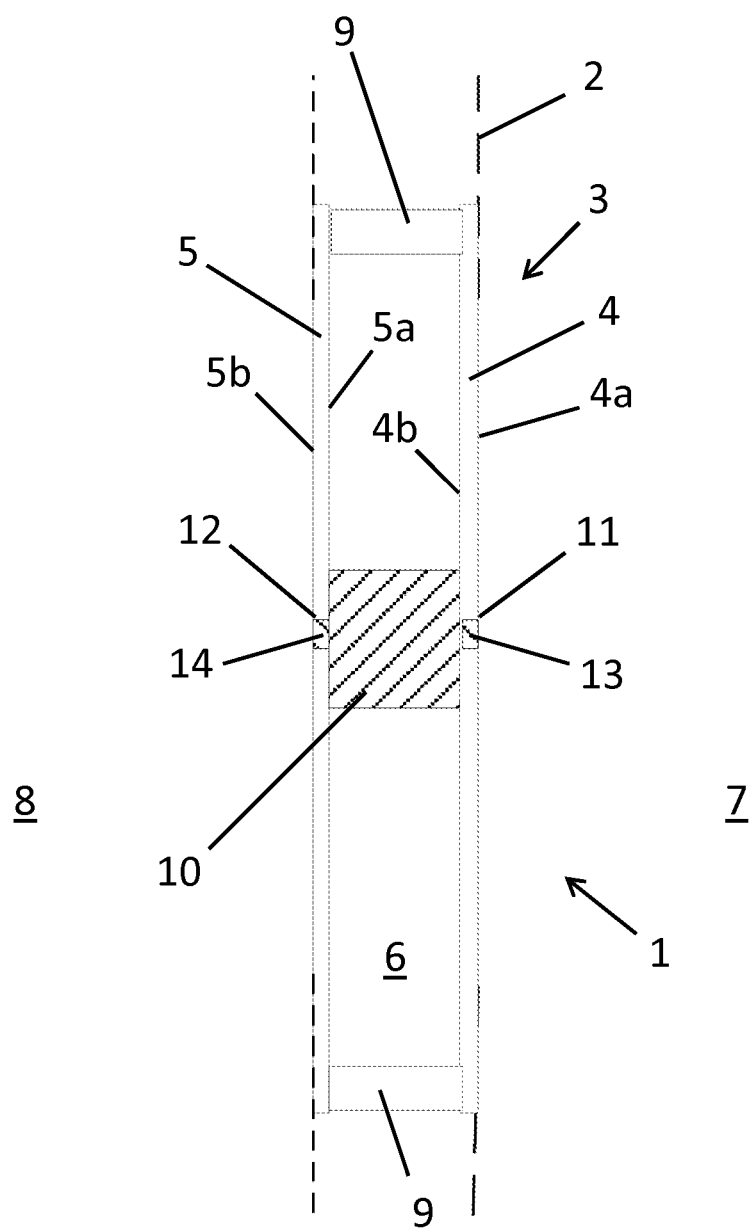
FIG. 1 shows a schematic cross-sectional view of a system according to an embodiment of the present invention, wherein the system and its window arrangement are part of an aircraft door.

The system 1 shown in FIG. 1 is integrated into a door 2 of an aircraft, which door 2 is only partly indicated in FIG. 1. The system 1 comprises a double glazed window arrangement 3 including an outer transparent windowpane 4 and an inner transparent windowpane 5, which are parallel and spaced from each other such that an interior space 6 is present between the outer and inner windowpanes 4, 5. No other windowpanes are disposed between the outer windowpane 4 and the inner windowpane 5. In the condition of the door 2 mounted in an aircraft, the outer windowpane 4 faces the exterior 7 of the aircraft, and the inner windowpane 5 faces the interior 8 of the aircraft, such as the interior 8 of the aircraft cabin.

The outer windowpane 4 comprises a first, outer surface 4a and a second, inner surface 4b, opposite to the first, outer surface. The inner windowpane 5 comprises a first, outer surface 5a and a second, inner surface 5b, opposite to the first, outer surface. The outer surface 4a of the outer windowpane 4 is in contact with the ambient atmosphere around the aircraft, i.e. the pressure existing in the exterior 7 of the aircraft acts on the outer surface 4a of the outer windowpane 4. Similarly, the inner surface 5b of the inner windowpane 5 is in contact with the atmosphere inside the cabin of the aircraft, i.e. the pressure existing in the interior 8 of the aircraft acts on the inner surface 5b of the inner windowpane 5.

The outer surface 4a of the outer windowpane 4 forms a portion of an exterior surface of the aircraft and of the door 2, and the inner surface 5b of the inner windowpane 5 forms a portion of an inner surface of the door 2. The inner surface 4b of the outer windowpane 4 and the outer surface 5a of the inner windowpane 5 face each other and delimit—together with sealing elements 9—the interior space 6.

Each of the outer and inner windowpanes 4, 5 comprises an air passage opening 11 and 12, respectively, which is provided as a through-hole extending between the inner and outer surfaces 4a, 4b and 5a, 5b, respectively, of the respective windowpane 4, 5.

Within the interior space 6 is disposed an electronic differential pressure sensor 10, which comprises two pressure ports 13, 14 on opposite sides of the sensor 10. The pressure port 13 is sealingly connected to the air passage opening 11 of the outer windowpane 4, and the pressure port 14 is sealingly connected to the air passage opening 12 of the inner windowpane 5. In the illustrated embodiment the pressure ports 13, 14 are provided as tubular projections extending into and being sealed to the respective air passage opening 11, 12.

Figure 2:
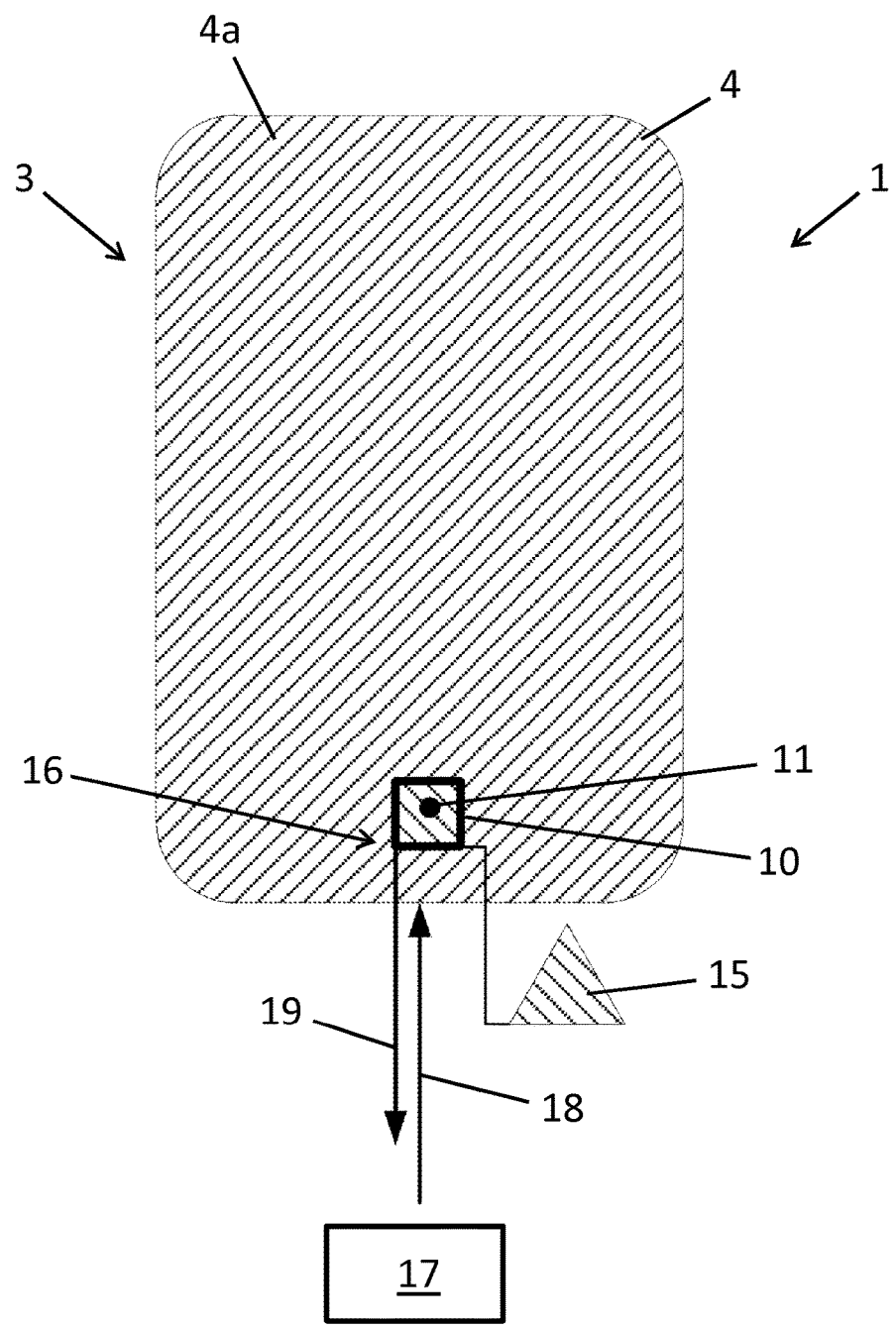
FIG. 2 shows a schematic plan view of the window arrangement of the embodiment shown in FIG. 1.

As shown in FIG. 2, the system 1 further comprises a power source 15, which may take the form of a rechargeable battery and is connected to power the pressure sensor 10. The power source 15 may be arranged on the door or integrated into the door 2 and away from the window arrangement 3. Further, the sensor 10 comprises an interface 16 via which it is operably connected to an external power source 17, which may be part of the normal energy supply system of the aircraft and may, alternatively, be an autonomous standby power supply unit. While the power source 15 is optional it may be provided to increase the maximum period of standby operation of the system 1 such as to extend operation while the external power source is off. For example, the power source 15 may be adapted to provide for five additional days of operation of the system 1 after the power source 17 has failed or has been deactivated. The interface 16 may be adapted to be coupled with a power supply line 18 connected to the power source 17 and with a GND/OC (Ground/Open Circuit) signal line 19 likewise connected to the power source 17.

The door 2 separates the exterior 7 of the aircraft and the interior cabin 8 of the aircraft from each other. For opening the door 2 a hinge (not shown) is provided which enables the door 2 being pivoted outwardly. In case a residual cabin pressure exists in the interior 8 of the cabin which is higher than the pressure in the exterior 7 of the aircraft at the time of opening the door 2, the door 2 is violently forced outwardly by the corresponding pressure difference existing over the door 2. The pressure sensor 10 is adapted to measure or detect such pressure difference, so that a suitable warning can be issued based on a measurement or detection signal generated by the sensor 10.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise.

The invention is:

1. A system for detecting a pressure difference between the interior of a cabin of an aircraft and the exterior of the aircraft, the system comprising:
    a pressure sensor comprising a first pressure port,
    a window arrangement including a first windowpane having a first surface and an opposite second surface, wherein the first windowpane is adapted to be mounted in an aircraft such that the first surface of the first windowpane is facing towards the exterior of the aircraft and is subjected to ambient atmospheric pressure and the second surface faces towards the interior of a cabin of the aircraft, and
    the first windowpane comprises a first air passage opening extending between the first and second surfaces of the first windowpane, and the pressure sensor is sealingly connected to the first air passage opening such that the first pressure port of the pressure sensor is subjected to pressure acting on the first surface of the first windowpane.

2. The system according to claim 1, wherein the pressure sensor further comprises a second pressure port in fluid communication with the interior of the cabin of the aircraft, and wherein the pressure sensor is a differential pressure sensor adapted to detect a pressure difference between the first pressure port and the second pressure port.

3. The system according to claim 2, wherein the pressure sensor is an electronic differential pressure sensor.

4. The system according to claim 1, wherein the window arrangement further comprises a second windowpane having a first surface and an opposite second surface, wherein the second windowpane is spaced from the first windowpane such that an interior space is defined by and between the first and second windowpanes, wherein a first surface of the second windowpane faces a second surface of the first windowpane and the second surface of the second windowpane faces away from the first windowpane and towards the interior of the cabin of the aircraft.

5. The system according to claim 4, wherein the pressure sensor further comprises a second pressure port in fluid communication with the interior of the cabin of the aircraft, and wherein the pressure sensor is a differential pressure sensor adapted to detect a pressure difference between the first pressure port and the second pressure port, and
the second windowpane comprises a second air passage opening extending between the first and second surfaces of the second windowpane, wherein the pressure sensor is mounted in one of the following arrangements:
inside the first air passage opening, and the second pressure port of the pressure sensor is sealingly connected to the second air passage opening,
inside and sealingly connected to the second air passage opening, and the first pressure port of the pressure sensor is sealingly connected to the first air passage opening, and
disposed in the interior space between the first and second windowpanes, and the first pressure port is sealingly connected to the first air passage opening and the second pressure port is sealingly connected to the second air passage opening.

6. The system according to claim 5, wherein the pressure sensor is an electronic differential pressure sensor.

7. The system according to claim 1, wherein the first pressure port of the pressure sensor is sealingly connected to the first air passage opening.

8. The system according to claim 1, wherein the pressure sensor is mounted inside the first air passage opening.

9. The system according to claim 1, wherein the pressure sensor comprises a threshold switch.

10. The system according to claim 1, wherein the system comprises an interface adapted for receiving energy from an external power supply.

11. The system according to claim 1, wherein the system comprises a power supply.

12. The system according to claim 11, wherein the power supply is a battery.

13. The system according to claim 1, wherein the window arrangement is part of an aircraft door.

14. An aircraft comprising a system according to claim 1.

15. The aircraft according to claim 14, further comprising a processing device coupled to the system, wherein the processing device is adapted to determine whether the aircraft is on the ground and to evaluate signals from the pressure sensor only if the aircraft is on the ground.

16. A system to detect a pressure difference with respect to an aircraft, system comprising:
a pressure sensor including first and second pressure ports;
an aircraft window assembly including an outer windowpane, wherein outer surface of the outer windowpane faces and is exposed to an exterior of an aircraft and an inner surface of the inner windowpane faces towards a cabin of the aircraft, and
a first air passage extending through the outer windowpane and open to the exterior,
wherein the first pressure port seals the first air passage such that the first pressure port is in fluid communication with the exterior and the second pressure port is in fluid communication with the cabin.

17. The system according to claim 16, wherein the pressure sensor is an electronic differential pressure sensor, and is configured to sense a pressure differences between the first and second pressure ports.

18. The system according to claim 16, wherein the window assembly is in a door of the aircraft.

19. A system to detect a pressure difference with respect to an aircraft, system comprising:
a pressure sensor including first and second pressure ports;
an aircraft window assembly including an outer windowpane, an inner windowpane and a gap separating the outer and inner window pane, wherein outer surface of the outer windowpane faces an exterior of an aircraft and an inner surface of the inner windowpane faces a cabin of the aircraft, and
a first air passage extending through the outer windowpane and open to the exterior and a second air passage extending through the inner windowpane and open to the cabin, and the first pressure port seals the first air passage such that the first pressure port is in fluid communication with the exterior and the second pressure port seals the second air passage seals the second air passage such that the second pressure port is in fluid communication with the cabin.

20. The system according to claim 19, wherein the pressure sensor is mounted in one of the following arrangements:
inside the first air passage;
inside the second air passage and
disposed in the gap.

* * * * *